United States Patent

Hägele et al.

(10) Patent No.: US 6,484,287 B1
(45) Date of Patent: Nov. 19, 2002

(54) MACRODIVERSITY TRANSMISSION IN A MOBILE RADIO SYSTEM

(75) Inventors: Frank Hägele, Korntal (DE); Samuel Konnerth, Ditzingen (DE)

(73) Assignee: Alcatel, Paris (FR)

(*) Notice: Subject to any disclaimer, the term of this patent is extended or adjusted under 35 U.S.C. 154(b) by 0 days.

(21) Appl. No.: 09/398,760

(22) Filed: Sep. 17, 1999

(30) Foreign Application Priority Data

Jul. 5, 1999 (EP) .................................. 99440181

(51) Int. Cl.[7] .................... G06F 11/10; H03M 13/00
(52) U.S. Cl. .............................................. 714/807
(58) Field of Search .................... 370/428, 392; 340/525, 901, 575; 710/53; 709/100, 112; 711/114; 714/6, 761, 807, 756, 784

(56) References Cited

U.S. PATENT DOCUMENTS

| 5,266,922 A | * | 11/1993 | Smith et al. ................ 340/525 |
| 5,539,749 A | | 7/1996 | Eul |
| 5,809,090 A | | 9/1998 | Buternowsky et al. |
| 5,892,925 A | * | 4/1999 | Aditya et al. ............... 709/230 |
| 6,047,001 A | * | 4/2000 | Kuo et al. ................... 370/428 |

FOREIGN PATENT DOCUMENTS

| EP | 0 777 395 A1 | 6/1997 |
| EP | 0 876 045 A1 | 11/1998 |
| GB | 2 324 446 A1 | 10/1998 |

OTHER PUBLICATIONS

Biliris (An efficient database storage structure for large dynamic objects; IEEE; on pp. 301–308; Feb. 2–3, 1992).*
TS 25.427.VO 201 (1999–06) 3GPP (3rd Generation Partnership Project) "UTRAN lub/lur Interface User Plane Protocol for DCH Data Streams" "http://wwww.3gpp.org" Jun. 1999, chapter 7.

Fabio Longoni, "TS 25.247. UTRAN:Iur/Iub User plane protocol for DCH data streams, v.0.4.2", TSG–RAN WG3, Online Sep. 20–24, 1999, XP002120580, Sophia Antipolis, France.

Fabio Longoni "TS 25.247: UTRAN Iur/Iub User plane protocol for DCH data streams, v.0.4.2" TSG–RAN WG3, Onlinne! Sep. 20–24, 1999, XP002120580 Sophia Antipolis, France Retrieved from the Internet: <UR :ftp://ftp.3gpp.org/TSG_RAN/WG3_Iu/TSG R3_07/Docs/Pdfs/r3–99c37.pdf> retreived on Oct. 26, 1999.

* cited by examiner

*Primary Examiner*—Albert Decady
*Assistant Examiner*—Guy Lamarre
(74) *Attorney, Agent, or Firm*—Sughrue Mion, PLLC

(57) ABSTRACT

Mobile radio systems are known in which base stations receive radio signals from a mobile station in parallel over different radio paths and forward the user data contained in the radio signals as data blocks to a central station. Transmission is in the form of data frames. In the receiver of the central station, erroneous data blocks are replaced with data blocks received correctly over another radio path. An erroneous data block is detected by means of an entry in an associated check field. To increase the reading of the check fields and access to the data blocks, a newly structured data frame is proposed. The data blocks are arranged immediately side by side, with each data block containing a number of bits divisible by 8 and all check fields are written into a check block provided for this purpose. This byte-oriented structure permits faster access to individual data blocks.

10 Claims, 4 Drawing Sheets

MACRODIVERSITY TRANSMISSION IN A MOBILE RADIO SYSTEM

BACKGROUND OF THE INVENTION

This invention relates to a method of transmitting data blocks from at least two radio base stations employing macrodiversity over at least two diversity links to a central station.

Furthermore, the invention relates to a data frame, a mobile radio system, a central station, and a base station for carrying out the method.

There are mobile radio systems with base stations which receive radio signals from a mobile station in parallel over different radio paths and which forward the user data contained in the radio signal to a central station. At the receiver of the central station, the erroneous user data received over one of the radio paths can be replaced with user data received correctly over another radio path. In other words, the user data are transmitted in parallel over separate diversity links in order to obtain at the receiving end as many correct user data as possible, i.e., to achieve the highest possible diversity gain.

In this connection, the document with the designation "TS 25.427, V 0.2.1" should be mentioned, which is part of the technical specification of the future mobile radio system UMTS (universal mobile telecommunications system), and which was published by the standardization body 3 GPP (3$^{rd}$ Generation Patnership Project) under the title "UTRAN Iub/Iur Interface User Plane Protocol for DCH Data Streams" on the home page "http://www.3gpp.org" in June 1999. Chapter 7 of that document describes a method of transmitting data blocks, namely so-called transport blocks, which contain user data and are transmitted from base stations, the so-called Nodes B, to a central station, the so-called Radio Network Controller, RCN. As described in Chapter 7 with reference to FIG. 1 and Table 1, the data blocks are inserted into a data frame, with each data block being preceded by an associated check field, the so-called checksum indicator. The contents of the check field indicate whether the subsequent data block is correct or not. The base stations transmit the data blocks in parallel over different diversity links to the central station, which then analyzes the check fields for each diversity link and which replaces an erroneous data block received over one diversity link with a corresponding correct data block received over another diversity link. Accordingly, that 3 GPP document describes a method of transmitting data blocks from at least two base stations employing macrodiversity over at least two diversity links to a central station wherein each of the base stations transmits the data blocks together with check fields within data frames to the central station, with each of the data blocks being assigned one of the check fields, wherein the central station analyzes the check fields for each of the diversity links to identify those data blocks which were correctly received, and wherein the central station replaces erroneous data blocks received over one of the diversity links with correct data blocks received over another one of the diversity links. Besides the method and the structure of the data frame, the 3 GPP document describes a mobile radio system, a central station, and a base station for carrying out the method.

SUMMARY OF THE INVENTION

The invention is predicated on recognition that, if the prior-art method is carried out using the conventional data frame structure, each data frame must be read in its entire length, i.e., from the first to the last bit, to find the individual check fields. Particular difficulties are caused during the read operation by the arrangement of the check fields, which results in the beginning of each data block being shifted backward by one bit, namely by the length of the preceding check field. Accordingly, reading the data blocks using byte-oriented addressing is not possible, and the data processing speed is reduced.

Starting from this recognition, the invention has for its object to improve the method referred to at the beginning and propose a newly structured data frame in order to expedite the analysis of the check fields and the access to the data blocks. Furthermore, a mobile radio system for carrying out the improved method, a central station, and a base station are to be provided.

The object is attained by a method of transmitting data blocks from at least two radio base stations employing macrodiversity over at least two diversity links to a central station, comprising: transmitting the data blocks from the base stations to the central station together with check fields within data frames, with each of the data blocks being assigned one of the check fields; analyzing the check fields for each of the diversity links at the central station to identify those data blocks which were correctly received; and replacing, at the central station, erroneous data blocks received over one of the diversity links with correct data blocks received over another one of the diversity links, characterized in that in each data frame, the data blocks are arranged immediately side by side, with each data block containing a number of bits divisible by 8, and that each data frame contains a check block into which the check fields are inserted and by a data frame, a mobile radio system, a central station, and a base station.

Accordingly, it is proposed to arrange the data blocks in each data frame immediately side by side, with each data block containing a number of bits divisible by 8, and to write the bits of the check fields together into a check block provided therefor. Thus, use is made of a data frame with a new structure that is characterized by an immediate succession of data blocks each comprising one byte or a multiple thereof. This results in a byte oriented structure which permits fast access to individual data blocks. With the data frame structure according to the invention and the novel method adapted thereto, a substantial increase in the speed of the digital signal processing in the receiver at the center is achieved.

Further advantageous features of the invention are apparent from the subclaims.

Particularly advantageously, each of the check fields contains at least one bit, and all bits of the check fields are written into the cheek block together, with the check block being filled with padding bits if necessary, so that the check block, too, contains a number of bits divisible by 8. This allows the check block to be addressed as a whole and to be read at a high rate.

It is also particularly advantageous to form for each data frame a check word from the bits of the check fields, to compare the check word with a first reference word for one of the diversity links in order to detect an erroneous data block received over this diversity link, and to subsequently compare the corresponding check word with a second reference word for another one of the diversity links in order to determine whether the corresponding data block was correctly received over this diversity link. Through these measures, only as many check words as necessary are analyzed and the correct data blocks are collected in a very short time by selective access.

In this connection it is particularly advantageous to produce a first result by ANDing the check word with the first reference word, to obtain a first intermediate value by ORing this first result with the negated first reference word, and to obtain the second reference word by negating this first intermediate value.

If at least one erroneous data block cannot be replaced with a corresponding correct data block, a particular advantage accrues if the process is terminated after expiration of a predeterminable period of time.

The invention will become more apparent from the following description of an embodiment when taken in conjunction with the accompanying drawings, in which.

Figure 1A:
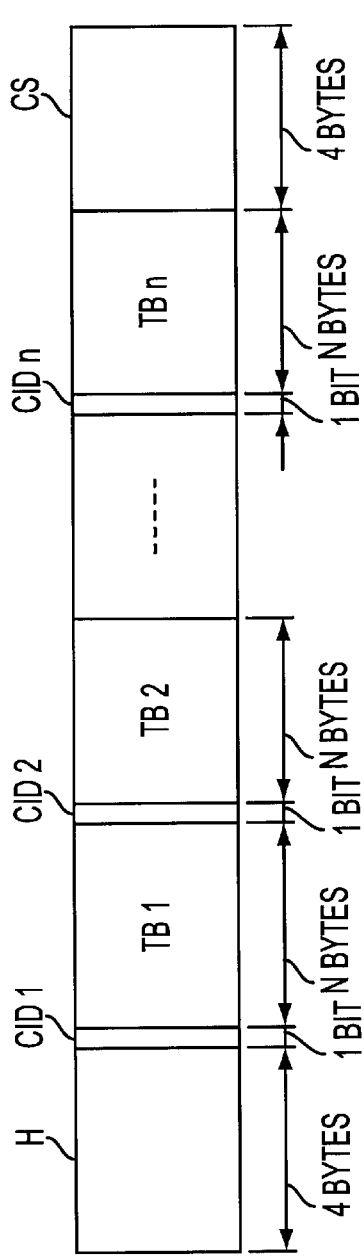
FIG. 1a shows the conventional structure of a data frame.

Referring to FIG. 1a, there is shown the structure of a data frame as is known from the prior art. The data frame begins with a header H, which has a length of, e.g., 4 bytes and contains information about the structure of the data frame. This information specifies, among other things, the number of data blocks TB1 to TBn contained in the data frame and the length of these data blocks. The data frame ends with a checksum field CS, which also has a length of four bytes. Conventionally, each of the data blocks TB1 to TBn is preceded by a check field ("checksum indicator") CID1 to CIDn, in which one bit is entered. The bit in the check field (e.g., CID1) indicates whether the subsequent data block (TB1) contains correctly received user data or not. The check fields CID1 to CIDn thus have the function of a flag that is set to logic 0 or logic 1.

The data frame is received by a central station and analyzed there to read the correct data blocks from the data frame. The conventional data frame structure shown in FIG. 1a requires, however, that the data frame be read in its entire length, i.e., from the first bit to the last, to find the individual check fields CID1 to CIDn. During the reading, particular difficulties are caused by the arrangement of the check fields, which results in the beginning of each data block being shifted backward by one bit, namely by the length of the preceding check field. This means, for example, that the first data block TB1 follows the end of the header H not immediately, but one bit later. The subsequent data block TB2 is shifted another bit to the back because of the preceding check field CID2. Thus, if the first data block TB1 has a length of, e.g., 10 bytes, the beginning of the second data block TB2 lies 10 bytes plus 2 bits behind the end of the header H. Accordingly, reading the data blocks by byte-oriented addressing is not possible and the data processing speed is reduced. Starting from this recognition, a novel data frame is proposed.

Figure 1B:
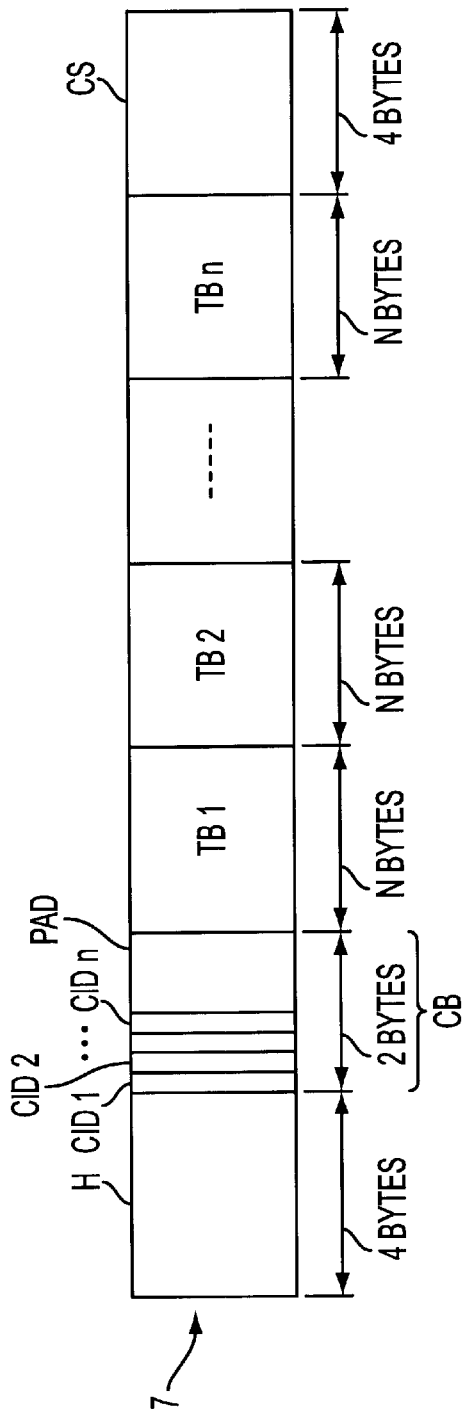
FIG. 1b shows the structure of a data frame according to the invention.

FIG. 1b shows a data frame structured in accordance with the invention. This data frame contains an additional check block CB which comes immediately after the header H and which is adjoined by the data blocks TB1 to TBn in direct succession. In the added check block CB, all check fields CID1 to CIDn are written in an unbroken sequence. The check block CB further includes some padding bits PAD, which ensure that the length of the check block corresponds to a number of bits divisible by 8. Thus, the check block CB has a byte-oriented length, in this example 2 bytes. This check block can thus be addressed and read as a whole in a very simple manner. As the data blocks TB1 to TBn are arranged immediately side by side, a byte-oriented structure is obtained which allows very fast and selective access to individual data blocks. The structure shown in FIG. 1b significantly increases the speed of the digital signal processing in the receiver at the central station.

Figure 2:
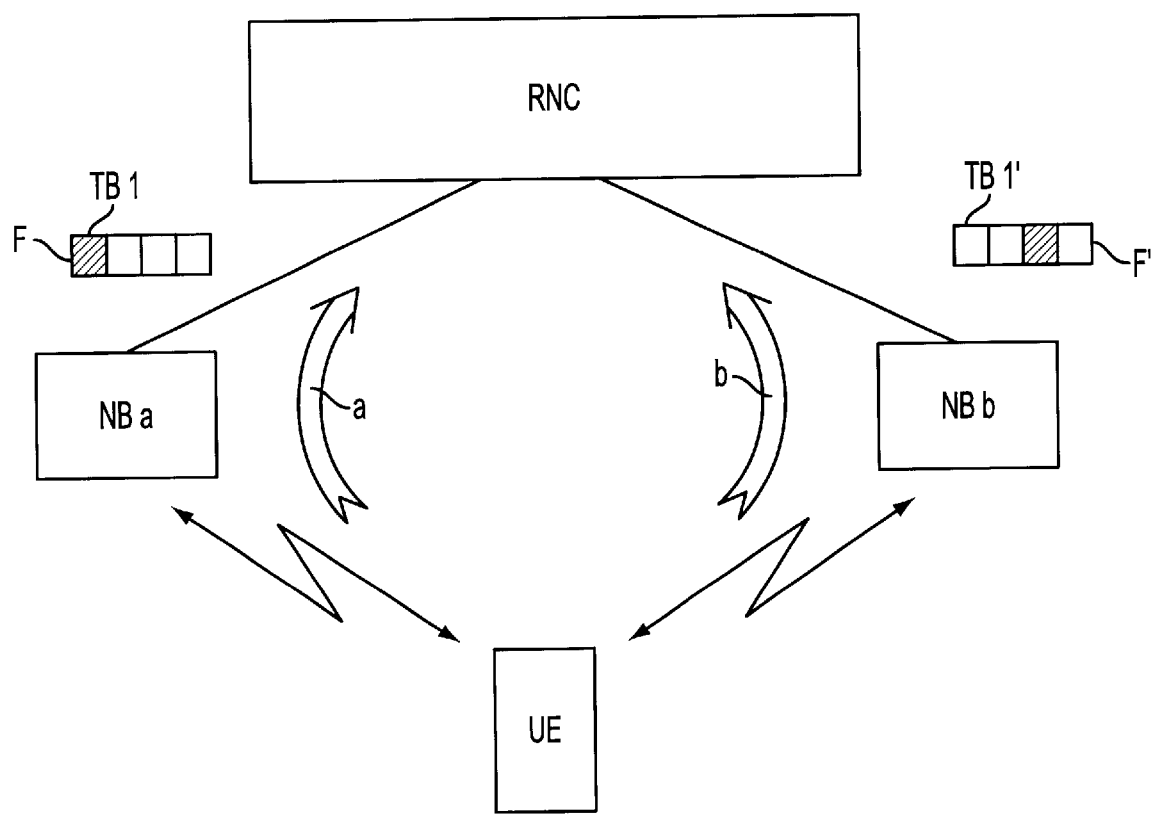
FIG. 2 shows schematically the structure of a mobile radio system according to the invention.

FIG. 2 shows schematically the structure of a mobile radio system in which data frames such as the one shown in FIG. 1b are transmitted. The mobile radio system is designed to carry out the below-described method according to the invention and comprises a central station RNC, to which a number of base stations are connected, of which two base stations NBa and NBb are shown in FIG. 2 by way of example. These two base stations are in a macrodiversity state, i.e., they simultaneously receive radio signals from a mobile station UE and forward the user data contained in the radio signals, in the form of the data frame structure shown in FIG. 1b, to the central station RNC. The central station RNC, in turn, tries to replace erroneous data blocks received from one of the base stations with corresponding correct data blocks received from the other base station. Thus, there are two macrodiversity links a and b over which the same user data are transmitted in parallel, with any erros being mutually compensated for. "Parallel transmission" as used herein means packet transmission of the same user data over different transmission links. Because of the packet transmission, the links need not be synchronized.

FIG. 2 illustrates the transmission of a data frame F structured according to the invention from the first station NBa to the central station RNC and the parallel transmission of a corresponding data frame F' from the second base station NBb to the central station RNC. The data frame F transmitted by the first base station NBa contains an erroneous data block TB1, which is detected at the central station RNC by the below-described method according to the invention, and which is replaced with a corresponding correct data block TB1 that is contained in the data frame F' transmitted by the second base station NBb. The central station RNC replaces the erroneous data block TB1 with the correct data block TB1', which contains the same user data as the data block TB1. In like manner, erroneous data blocks transmitted by the second base station NBb (e.g., the third data block) are replaced with corresponding data blocks transmitted by the first base station. Accordingly, the same user data are transmitted within the data frames F and F' in parallel over the two macrodiversity links a and b, with any errors being mutually compensated for. Using the method according to the invention, which is described in the following, this compensation can be performed very fast.

Figure 3:
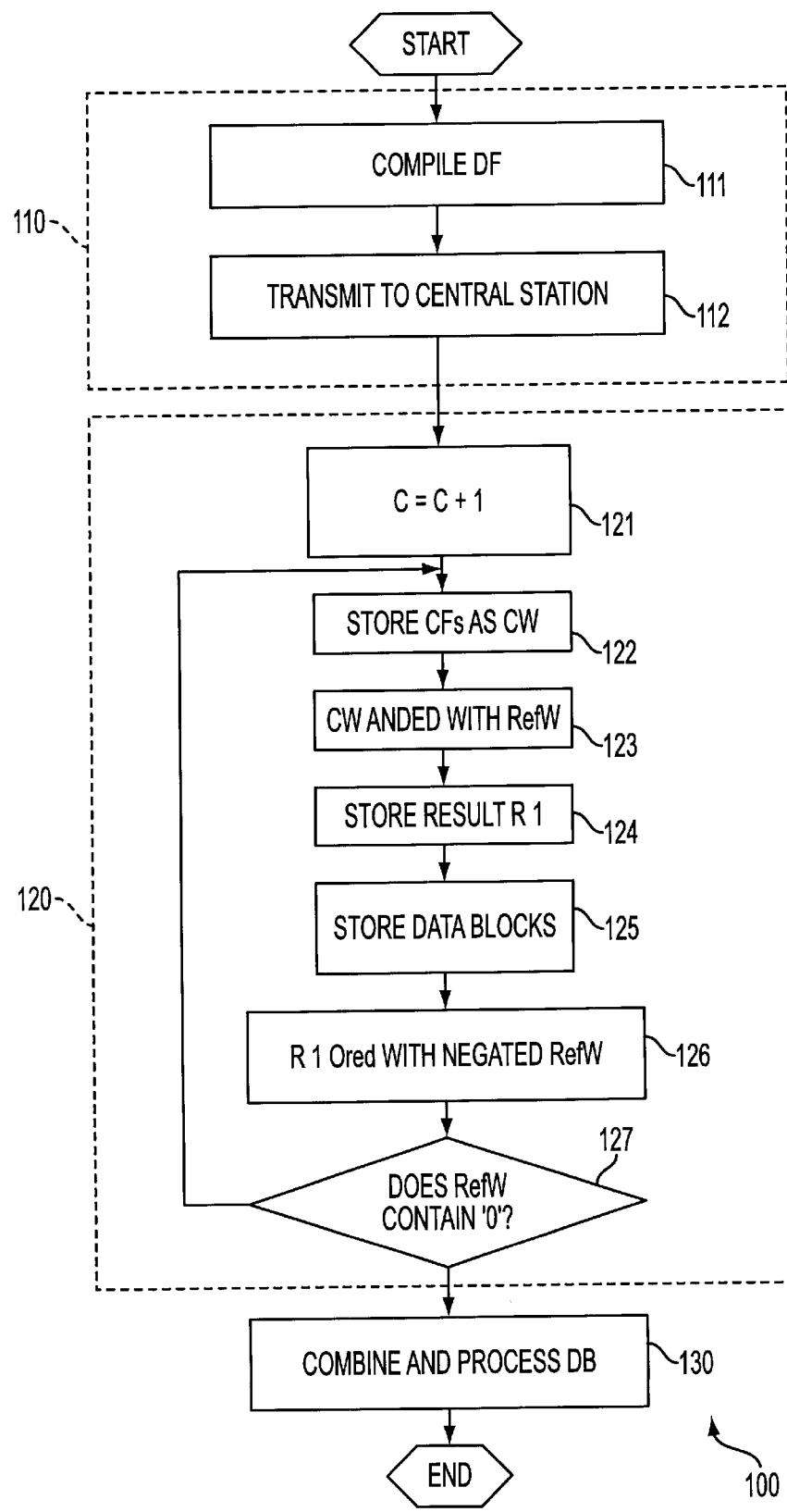
FIG. 3 is a flowchart for a method according to the invention.

FIG. 3 shows the flowchart for a method 100 of transmitting data blocks from at least two base stations employing macrodiversity to a central station. The method comprises steps 110 to 130. Step 110 is divided into two partial steps 111 and 112, and step 120 into partial steps 121 to 127. The transmission of data blocks from the first base station to the central station will now be described in detail by way of example, reference being also made to FIGS. 1b and 2: After the start of the method 100, the data frame to be transmitted is compiled within and transmitted by the base station NBa (step 110). In a first partial step 111, the data blocks to be transmitted, TB1 to TBn, are arranged immediately side by side and inserted into the data frame F. Ahead of the data blocks to be transmitted, a check block CB is inserted into the data frame F. The check block CB contains the check fields CID1 to CIDn associated with the data blocks as well as a number of padding bits PAD. The data frame F thus has the structure shown in FIG. 1b. In a partial step 112, it is transmitted from the base station NBa to the central station RNC.

In a next step 120, the data frame F is received and processed by the central station in partial steps 121 to 127. This data processing is described in the following also with reference to FIG. 4. For simplicity it will be assumed that the data frame to be transmitted, F. contains only four data blocks (n=4) and a corresponding number of check fields CID1 to CID4. The check fields, which each contain one bit, are written in the check block CB together with 12 padding bits, so that the check block comprises two bytes.

Figure 4:
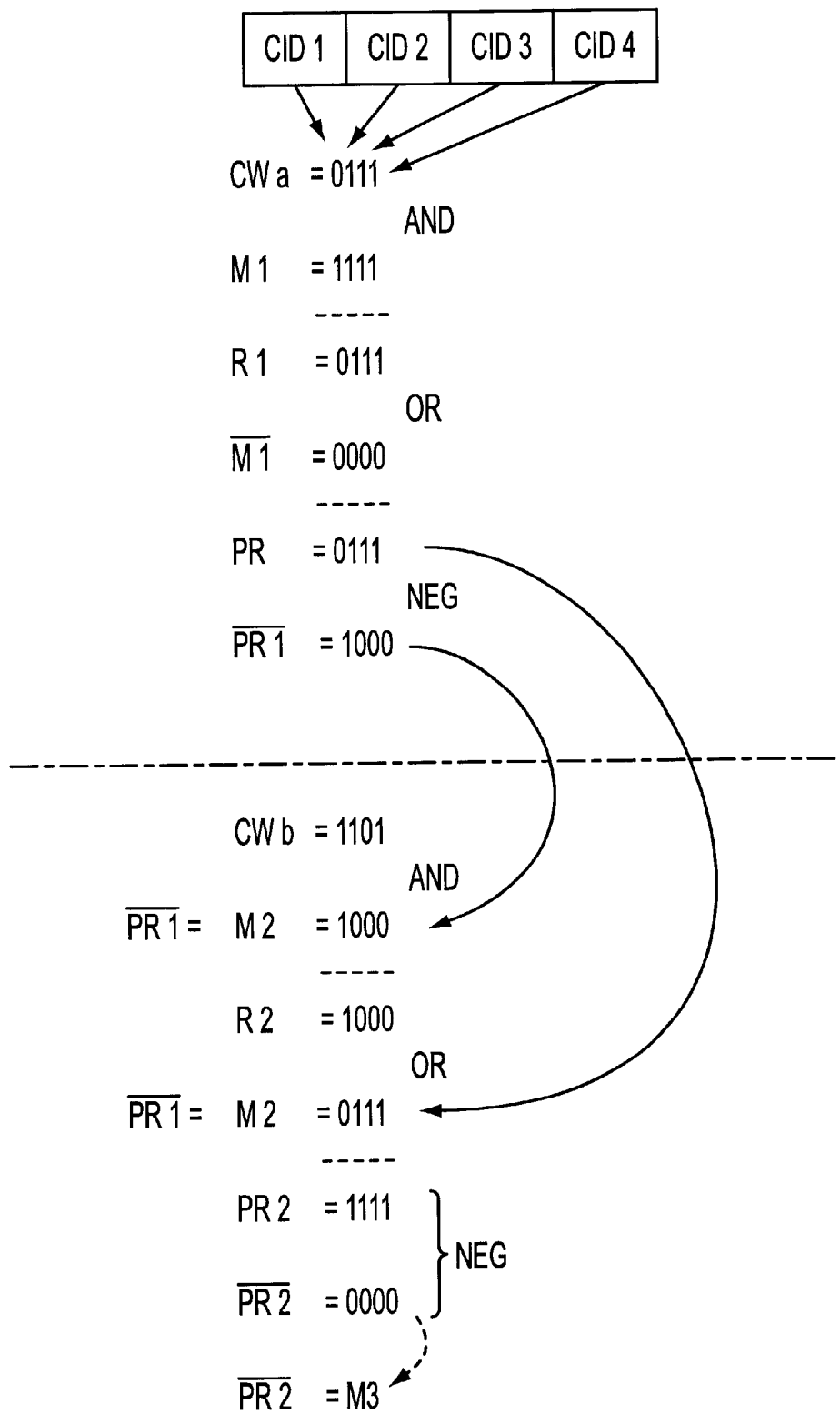
FIG. 4 illustrates schematically the processing of check words by this method.

As shown in FIG. 4, the four check fields CID1 to CID4 have been combined into one check word CWa="0111". The index a signifies that these check fields and the data blocks associated with them are transmitted from the first base station Nba to the central station. According to the method of the invention, shown in FIG. 3, in a first partial step 121, the count of a counter set to zero is incremented by one, which is to indicate that first the data received over the first diversity link a are evaluated. In a next partial step 122, the four check fields CID1 to CID4 are read, and stored temporarily as a check word CWa. In a next step 123, this check word CWa="0111" is ANDed with a first reference word M1="1111". The first reference word M1 corresponds to a mask that is used to determine which bits within the check word CWa are set at logic 0 or logic 1. The outcome of the AND operation, a first result R1, is stored temporarily in partial step 124. In this example, the first result R1="0111" indicates that with the exception of the first check field CID1="0", all check fields, i.e., CID2 to CID4, are set at logic 1. This means that only the first data block TB1 was erroneous. All other data blocks TB2 to TB4 were correctly received and are entered into a user data memory (partial step 125).

To replace the erroneous data block TB1 received over the first diversity link a with a corresponding correct data block TB1' received over the other diversity link b, a new reference word M2 is generated, which is used to analyze the check word received from the second base station, CWb="1101". In a next partial step 126, the result R1="0111" is ORed with the negated first reference word "0000". This gives a first intermediate value PR1="0111", which is negated into the word "1000". The negated intermediate value is taken as a second mask M2="1000" and ANDed with the second check word received over the diversity link b. This gives a second result R2, which in this example corresponds to the logic word "1000" and thus indicates that the the second base station NBb is correct. This second result R2 is also entered into the user data memory.

As the figures, particularly FIG. 4, illustrate, according to the method of the invention, all correct data blocks received over one of the diversity links are collected and stored and the erroneous data blocks received over this diversity link are replaced by the corresponding correct data blocks received over the other diversity link. The -arrangement of the check fields CID1 to CIDn in accordance with the invention and the immediate succession of the data blocks in the data frame (see FIG. 1b) permit very fast addressing of the data blocks and, thus, very fast access to the individual data blocks. In-other words, the byte-oriented data frame structure allows individual erroneous data blocks to be detected and replaced by corresponding correct data blocks very fast.

In a further partial step 127, a check is made to determine whether the last used reference word contains at least one logic 0. If that is the case, this means that there is still at least one erroneous data block that has to be replaced. In that case, partial steps 121 to 126 must be performed again, with the count n being incremented by one. The incrementing of the count n results in the next diversity link b being used to analyze the received data frames. If it is determined in step 127 that the last generated reference word (here: M3="0000") does not contain a logic 1, this indicates that there is no longer an erroneous data block that would have to be replaced. Therefore, the process goes to step 130, in which all correctly received and temporarily stored data blocks are combined and processed as user data. The process is thus complete.

For the case where no correct data blocks are received over any of the existing diversity links, a time counter is provided which terminates the process after expiration of a predeterminable time, e.g., 10 ms. The time counter starts with partial step 121 in FIG. 3. When the predetermined time expires, the execution of the Loop shown in FIG. 3 is terminated and the process goes to step 130. This avoids unnecessary waiting times during the execution of the loop shown in FIG. 3.

Individual erroneous and nonreplaceable data blocks may be corrected by an end-to-end error correction in the receiver of the central station. If the user data in the data blocks are speech data, such a correction can, as a rule, be performed without a noticeable loss of speech quality. In that case, even a certain frequency of erroneous data blocks corresponding to a predeterminable frame error rate of, e.g., $10^{-3}$ can be tolerated. The same applies to the transmission of video or fax data.

During the transmission of nonvoice data in the form of pure arithmetic data, nonreconstructible data blocks must generally be requested again by the central station from the mobile station via the base stations.

The invention is not limited to the embodiment described but comprises conceivable variants. For example, the method is also applicable to only one point-to-point connection. It is also conceivable that each data frame also includes two or more check blocks to be assigned to one group of data blocks each. In this manner, particularly long data frames can be formed. Also, the position(s) of the check block(s) within the data frame can be varied.

What is claimed is:

1. A method (100) of transmitting data blocks (TB1, TB2, . . . , TBn) from at least two radio base stations (NBa; NBb) employing macrodiversity over at least two diversity links (a; b) to a central station (RNC), comprising:

transmitting the data blocks (TB1, TB2, . . . , TBn) from the base stations (NBa; NBb) to the central station (RNC) together with check fields (CID1, CID2, . . . , CIDn) within data frames (F; F'), with each (TB1) of the data blocks being assigned one (CID1) of the check fields;

analyzing the check fields for each of the diversity links (a; b) at the central station (RNC) to identify those data blocks which were correctly received; and replacing, at the central station (RNC), erroneous data blocks (TB1) received over one (a) of the diversity links with correct data blocks (TB1') received over another one (b) of the diversity links, wherein, in each data frame (F), the data blocks (TB1, TB2, . . . , TBn) are arranged immediately side by side (step 111), with each data block (TB1) containing a number of bits divisible by 8, and wherein each data frame (F) contains a check block (CB) into which the check fields (CID1, CID2, ..., CIDn) are inserted.

2. A method (100) as claimed in claim 1, wherein each of the check fields (CID1, CID2, ..., CIDn) contains at least one bit, that all bits of the check fields (CID1, CID2, ..., CIDn) are written into the check block (CB) together, and wherein, if necessary, the check block (CB) is filled with padding bits (PAD) (step 112), so that the check block (CB) also contains a number of bits divisible by 8.

3. A method (100) as claimed in claim 2, wherein for each data frame (F), a check word (CWa; CWb) is formed from the bits of the check field (step 123), wherein, for one (a) of the diversity links, the check word (CWa) is compared with a first reference word (M1) (step 124) to detect at least one erroneous data block (TB1) received over said diversity link (a), and wherein, for another one (b) of the diversity links, the corresponding check word (CWb) is then compared with a second reference word (M2) to determine whether the corresponding data block (TB1') was correctly received over said other diversity link (b).

4. A method (100) as claimed in claim 3, wherein a first result (R1) is obtained by forming the logic AND of the check word (CWa) and the first reference word (M1) (step 124), wherein a first intermediate value (PR1) is obtained by forming the logic OR of said first result (R1) and the negated first reference word, and wherein the second reference word (M2) is obtained by negating said first intermediate value (step 126).

5. A method as claimed in claim 1, wherein, if at least one erroneous data block cannot be replaced with a corresponding correct data block, the method is terminated after expiration of a predeterminable period of time.

6. A data frame (F) for transmitting data blocks (TB1, TB2, ..., TBn) from a first radio base station (NBa), which is in a macrodiversity state with at least a second radio base station (NBb), over a diversity link (a) to a central station (RNC), wherein each (TB1) of the data blocks is assigned a check field (CID1) so that the central station (RNC) can analyze the check fields to identify those data blocks (TB2, ..., TBn) which were correctly received, and to detect erroneous data blocks (TB1) and replace said erroneous data blocks (TB1) with correct data blocks (TB1') received over another one (b) of the diversity links, wherein, in the data frame (F), the data blocks (TB1, TB2, ..., TBn) are arranged immediately side by side, with each data block (TB1) containing a number of bits divisible by 8, and wherein the data frame (F) contains a check block (CB) into which the check fields (CID1, CID2, ..., CIDn) are inserted.

7. A mobile radio system comprising a central station (RNC) and at least two base stations (NBa; NBb) employing macrodiversity which transmit data blocks (TB1, TB2, ..., TBn) together with check fields (CID1, CID2, ..., CIDn) within data frames (F; F') over at least two diversity links (a; b) to the central station (RNC), with each (TB1) of the data blocks being assigned one (CID1) of the check fields, the central station (RNC) comprising a receiver which receives the data blocks (TB1, TB2, ..., TBn) together with the check fields (CID1, CID2, ..., CIDn) and which comprises a diversity receiving section (DHO) which analyzes the check fields for each of the diversity links (a; b) to identify correctly received data blocks, and which replaces erroneous data blocks (TB1) received over one (a) of the diversity links with correct data blocks (TB1') received over another one (b) of the diversity links, wherein each (NBa) of the base stations comprises a transmitter which arranges the data blocks (TB1, TB2, ..., TBn) in each data frame (F) immediately side by side, with each data block (TB1) containing a number of bits divisible by 8, and wherein each data frame (F) contains a check block (CB) into which the transmitter inserts the check fields (CID1, CID2, ..., CIDn).

8. A central station (RNC) connected with at least two radio base stations (NBa; NBb) by at least two diversity links (a; b), said at least two radio base stations employing macrodiversity, said central station (RNC) comprising a receiver which receives data blocks (TB1, TB2, ..., TBn) together with check fields (CID1, CID2, ..., CIDn) within data frames (F; F') transmitted from the radio base stations (NBa, NBb) to the central station (RNC), with each (TB1) of the data blocks being assigned one (CID1) of the check fields, said receiver comprising a diversity receiving section (DHO) which analyzes the check fields for each of the diversity links (a; b) to identify correctly received data blocks, and which replaces the erroneous data blocks (TB1) received over one (a) of the diversity links with correct data blocks (TB1') received over another one (b) of the diversity links, wherein in each data frame (F), the data blocks (TB1, TB2, ..., TBn) are arranged immediately side by side, with each data block (TB1) containing a number of bits divisible by 8, wherein the check fields (CID1, CID2, ..., CIDn) are inserted in a check block (CB), and wherein the diversity receiving section (DHO) comprises an analyzing unit for analyzing the check block (CB) and a data memory controlled by the analyzing unit for subsequently storing the correctly received data blocks (TB1, TB2', ..., TBn).

9. A radio base station (NBa) which together with at least one other radio base station (NBb) are in a macrodiversity state in which the radio base stations transmit data blocks (TB1, TB2, ..., TBn) together with check fields (CID1, CID2, ..., CIDn) within data frames (F; F') to the central station (RNC), said radio base station (NBa) comprising:

a transmitter which assigns one (CID1) of the check fields to each (DB1) of the data blocks so that the central station (RNC) can analyze the check fields for each of the diversity links (a; b) in order to identify correctly received data blocks and to replace erroneous data blocks (TB1) received over one (a) of the diversity links with correct data blocks (TB1') received over another one (b) of the diversity links, wherein the transmitter of the radio base station (NBa) arranges the data blocks (TB1, TB2, ..., TBn) in each data frame (F) immediately side by side, with each data block (TB1) containing a number of bits divisible by 8, and wherein the transmitter inserts the check fields (CID1, CID2, ..., CIDn) into a check block (CB).

10. A radio base station (NBa) as claimed in claim 9, wherein the radio base station (NBa) comprises a receiver for receiving user data from a mobile station (UE) and checking said user data for errors and a computer-controlled unit connected to the receiver and the transmitter for writing the user data into the data blocks (TB1, TB2, ..., TBn), with the computer-controlled unit marking those of the data blocks (TB1) into which erroneous user data are written by entries in the corresponding check fields (CID1).

* * * * *